United States Patent [19]

Peterman

[11] Patent Number: 5,623,654
[45] Date of Patent: Apr. 22, 1997

[54] FAST FRAGMENTATION FREE MEMORY MANAGER USING MULTIPLE FREE BLOCK SIZE ACCESS TABLE FOR A FREE LIST

[75] Inventor: Jim Peterman, Dallas, Tex.

[73] Assignee: Texas Instruments Incorporated, Dallas, Tex.

[21] Appl. No.: 298,990

[22] Filed: Aug. 31, 1994

[51] Int. Cl.$^6$ .................................................. G06F 17/30
[52] U.S. Cl. ..................... 395/622; 364/DIG. 1; 364/222.81; 364/282.2; 364/282.1
[58] Field of Search .............................................. 395/600

[56] References Cited

U.S. PATENT DOCUMENTS

| | | | |
|---|---|---|---|
| 5,109,336 | 4/1992 | Guenther et al. | 395/497.02 |
| 5,301,104 | 4/1994 | Yalamanchili | 385/800 |
| 5,355,483 | 10/1994 | Serlet | 395/481 |
| 5,461,712 | 10/1995 | Chelstowski et al. | 395/164 |
| 5,490,274 | 2/1996 | Zbikowski et al. | 395/700 |

*Primary Examiner*—Wayne Amsbury
*Attorney, Agent, or Firm*—W. Daniel Swayze, Jr.; W. James Brady, III; Richard L. Donaldson

[57] ABSTRACT

A memory manager for operating a memory computing system, determines free block size of a free block size of a free block of a system memory to be used by an application program; determines an entry in a table having a table size less than a system size of said system memory, the entry being obtained by the free block size such that the entry may be obtained by at least two different free block sizes and each entry of the table having substantially the same number of free blocks accessing the table, accesses a free list through the entry in the table, said free list being associated with all of free blocks being of the free block size and requests one of the all of said free block of the free block size for an application to use in said memory system.

14 Claims, 12 Drawing Sheets

TABLE 1:

| DESIGN | T1 | T2 | DeltaT% |
|---|---|---|---|
| cf64467 | 51.9 | 2.9 | 94.4% |
| cftgc5d | 18.9 | 1.6 | 91.5% |
| cftgc3d | 18.9 | 1.6 | 91.5% |
| cfdlm1 | 19.3 | 2.6 | 86.5% |
| cf64048 | 5.3 | 1.3 | 75.5% |
| cf64644 | 2.9 | 1.0 | 65.5% |
| miura2 | 975.0 | 315.0 | 67.7% |
| cf64136 | 5.5 | 2.0 | 63.6% |
| cftik3 | 33.4 | 13.9 | 58.4% |
| cf64194a | 2.0 | 0.9 | 55.0% |
| cf65983 | 8.9 | 4.1 | 53.9% |
| cf33117a | 17.8 | 8.4 | 52.8% |
| cf64835 | 7.0 | 3.5 | 50.0% |
| cf33109c | 8.3 | 4.2 | 49.4% |
| cf65583 | 11.4 | 5.8 | 49.1% |
| cf64502 | 41.4 | 22.7 | 45.2% |
| cf64190 | 2.1 | 1.2 | 42.9% |
| cf33116a | 14.5 | 8.9 | 38.6% |
| cf64194 | 1.3 | 0.8 | 38.5% |
| cfbnr | 1.4 | 0.9 | 35.7% |
| cf33072 | 74.3 | 48.6 | 34.6% |
| cf64194a | 1.3 | 0.9 | 30.8% |
| cf64524 | 3.4 | 2.5 | 26.5% |
| cf68019 | 27.4 | 21.2 | 22.6% |
| cf33109 | 5.2 | 4.2 | 19.2% |
| cf33108 | 6.5 | 5.3 | 18.5% |
| cf12345 | 1.1 | 0.9 | 18.2% |
| cfbigm2 | 68.8 | 57.0 | 17.2% |
| cf64700a | 1.9 | 1.6 | 15.8% |
| cf2tgc5t | 1.9 | 1.6 | 15.8% |
| cf64796 | 7.3 | 6.2 | 15.1% |
| cf64667 | 3.5 | 3.0 | 14.3% |
| cf32247 | 13.3 | 11.4 | 14.3% |
| cf64512 | 5.7 | 4.9 | 14.0% |
| cf64822 | 10.2 | 8.8 | 13.7% |
| cf64767a | 2.2 | 1.9 | 13.6% |
| cf64776 | 3.1 | 2.7 | 12.9% |
| cf64889 | 30.9 | 27.0 | 12.6% |

FIG. 8

FAST FRAGMENTATION FREE MEMORY MANAGER USING MULTIPLE FREE BLOCK SIZE ACCESS TABLE FOR A FREE LIST

TECHNICAL FIELD OF THE INVENTION

This present invention relates to data processing systems and more particularly to processes for memory space allocation and deallocation.

BACKGROUND OF THE INVENTION

Working storage is used by data processing systems to include control blocks, buffers, data areas and state vectors associated with the operation of a computer system in its execution of application programs or other work. Working storage is assigned from a portion of the physical memory of the data processing system. Physical memory typically is the form of a semiconductor memory.

A data processing system can include one or more processors which share a single physical memory. Each of the processors will run a plurality of tasks that continually demand the allocation of working storage and later release the working storage allocated (deallocation).

When a data processing system is first initialized, a certain portion of memory is dedicated as working storage. This storage is then allocated and used for the process of dynamic storage allocation or memory management.

In conventional memory managers, the continued allocation and deallocation of storage blocks results in a fragmented effect such as illustrated in FIG. 1. A series of allocated storage blocks such as 103 or 105 are separated by free areas, free blocks or available blocks, for example 102 and 104. This arrangement results in a great degree of fragmentation and wasteful use of storage. Storage inefficiency can be divided into at least two types of fragmentation. Internal fragmentation results when the storage allocation algorithm allocates more storage then requested through the process of rounding up storage request through an arbitrary boundary. The end result is that the allocated segments including extra, un-need storage space which could be more effectively used elsewhere. External fragmentation occurs by alternating blocks of available and in use storage are created through the allocation and deallocation process. The available blocks scattered throughout the storage area may be too small to satisfy a request for working storage. However, in aggregate, they represent a significant loss of working storage capacity. Central processing unit (CPU) inefficiency results when the system must spend considerable time searching through lists of available storage for a storage block that will satisfy a request for working storage. Available working storage blocks are typically managed as a linked link list of addresses in memory by links 106. A global storage list will contain an entry for each working storage block available in the processing system. A header record points to the first available storage block in working storage. A linked list is developed with each available storage block pointing to a successive storage block with the last storage block containing an end of the list indicator. A major drawback to the allocation method based on linked lists of available storage locations is the amount of processor time required to search the list in order to find an available block. The search time may be considerable if each search begins at the beginning of the list and proceeds until an available block of the appropriate size is found. Because allocation of blocks starts at the beginning of free storage, the smaller fragments of storage tend to occur at the beginning of the list. Thus, it is because at each time storage is allocated, only the amount of storage requested is actually allocated with whatever excess is available in the current block being broken off into a smaller fragment. The small fragments tend to aggregate toward the front of the storage area.

The prior art systems may employ a technique known as "garbage collection" to recover the unused storage blocks. The garbage collection process attempts to detect all unused entries and return them to the free list so that they may be allocated as efficiently as possible. This garbage collection process may be run periodically. The disadvantage of this periodic garbage collection is the increased processor workload required to place all items back on the free list and then to rebuild fixed sized queues. Thus, the management of memory resources may include three basic operations: allocation, deallocation and consolidation. If the process of fragmentation would continue unchecked, eventually the memory is divided into many small blocks of memory and a computer is unable to satisfy allocation requests for memory portions larger than the largest fragment. Thus, a scheme for deallocation is required. Thus, specific special purpose memory managers have been proposed, but these special purpose memory managers have not been applicable to replace a general purpose memory manager.

SUMMARY OF THE INVENTION

A block of free space memory is managed by quickly and efficiently obtaining a free area or blocks sufficiently large to meet the requirements of the application program which requires a portion of memory without exhaustively or extensively searching a linked list of free block areas.

The present invention first accesses a free table indexed by free block size. From the free table, free lists are obtained which are homogeneous in size and then from the free list, the circular link list is accessed to determine the next available free block.

The present invention includes a method for operating a memory computing system, the method including the steps of: determining a free block size of a free block of a system memory to be used by an application program, determining an entry in a table having a table size less than a system size of said system memory, the entry being obtained by the free block size such that the entry may be obtained by at least two different free block sizes and each entry of the table having substantially the same number of free blocks accessing the table accessing a free list through the entry in said table, the free list being associated with all of free blocks being of the free block size requesting one of the all of the free block of the free block size for an application to use in said memory system.

The present invention further includes the step of determining an additional entry by using a modulo function of said free block size. The present invention includes the step of determining an entry by using a modulo 1024 function of said free block size. The present invention includes the step of accessing a free list by a pointer. The present invention further includes the step of accessing said free block by a pointer. The present invention further includes the step of positioning said free list behind an allocated block of said system. The present invention further comprises the step of allocating blocks of memory behind said free list.

The present invention includes a method for operating a memory computing system, said method comprising the steps of: determining a free block size of a free block of a system memory to be used by an application program; determining an entry in a table having a table size less than a system size of said system memory, the entry being obtained by the free block size such that the entry may be accessed by at least two different free block sizes and each of the entry of the table having substantially the same number of free blocks accessing the entry of said table; determining if a free list has been created corresponding to said entry creating a free list if the free list had not been created corresponding to said entry; connecting the free block to a circular file of at least one additional free block of the same size.

DESCRIPTION OF THE DRAWINGS

FIG. 8 illustrates the results of the present invention;

DETAILED DESCRIPTION OF THE INVENTION

Figure 1:
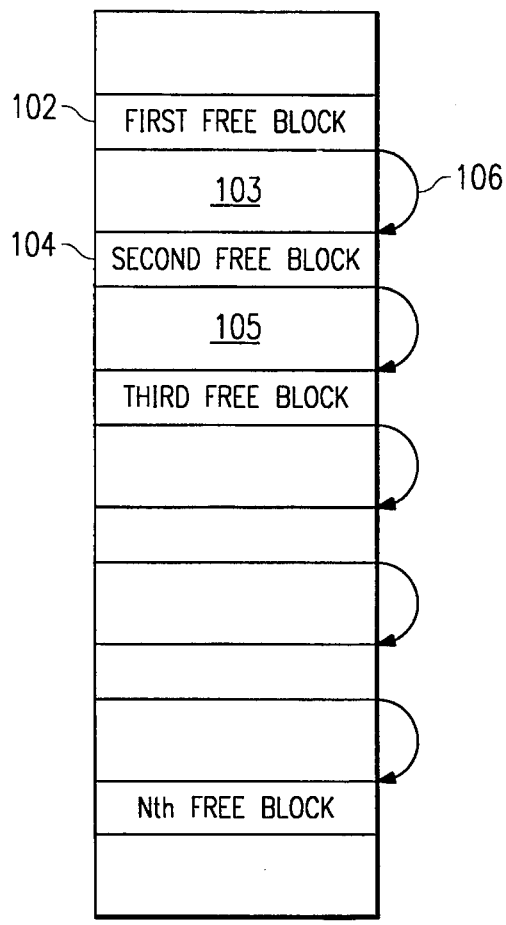
FIG. 1 illustrates memory of free blocks which are interconnected with links.
Figure 2:
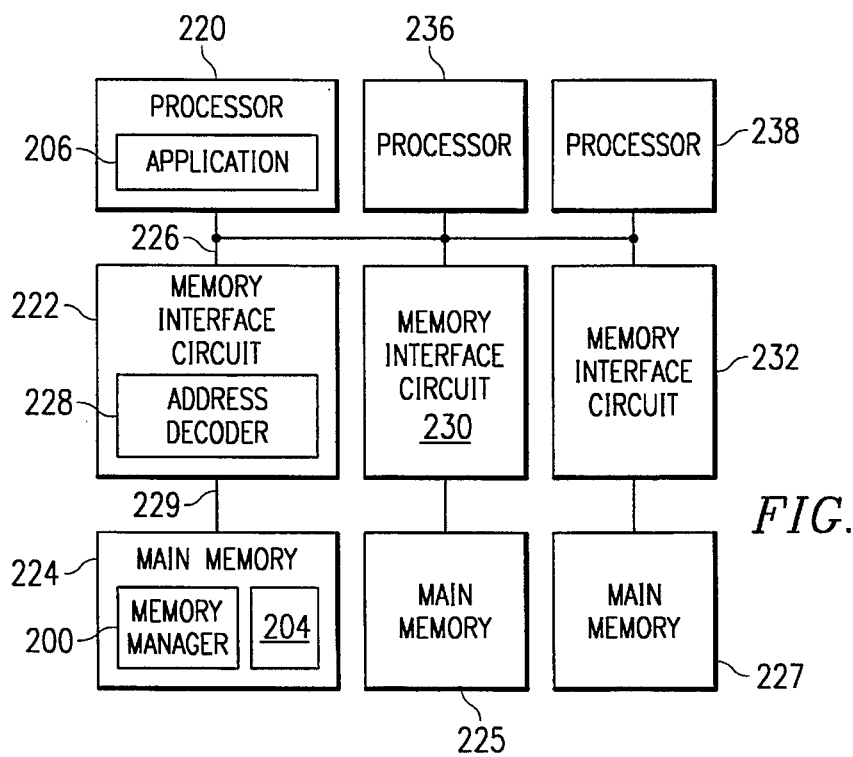
FIG. 2 illustrates a circuit diagram of the present invention.

Referring to FIG. 2, the system of the present invention may include processor 220 connected to memory interface circuit 222 by directional bus 226 which conducts data between processor 220 and memory interface 222. Furthermore, the processor 220 may be coupled to other memory interfaces 230, 232 by bus 226. The memory interface circuit 222 may be connected to main memory 224 by bus 229. The memory interface circuit 222 may include an address decoder 228 to decode addresses of data accessing main memory 224 by the data from processor 220. Additionally, the processors 236 and processor 238 may be connected through by directional bus 226 to any of memory interface circuits 222, 230 or 232. Although the memory manger 200 is shown in main memory 224, any of main memory 224, 225, 227 may have a memory manager 200.

Figure 3:
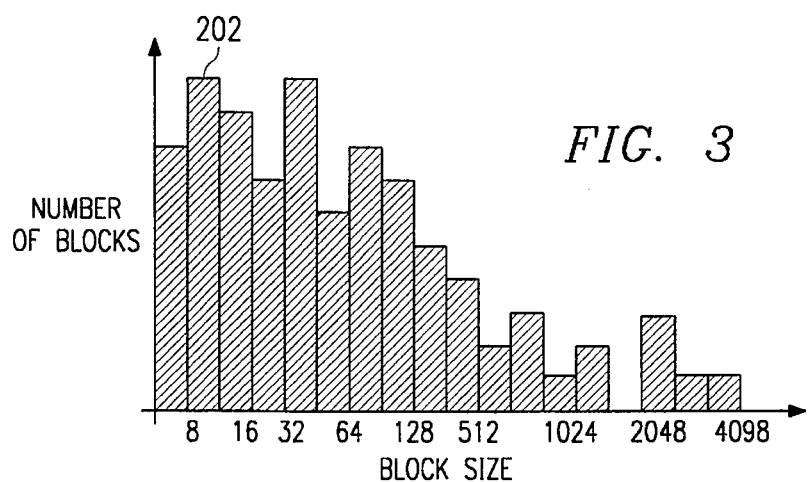
FIG. 3 illustrates a relationship illustrating the number of occurrences of differing free block sizes.

FIG. 3 illustrates the number of allocated blocks as related to the size of these blocks. As the block size increases, the number of request for such a block size decreases. For instance element 202 illustrates the number of free block for being requested for a free block 8 bytes in length.

Figure 4:
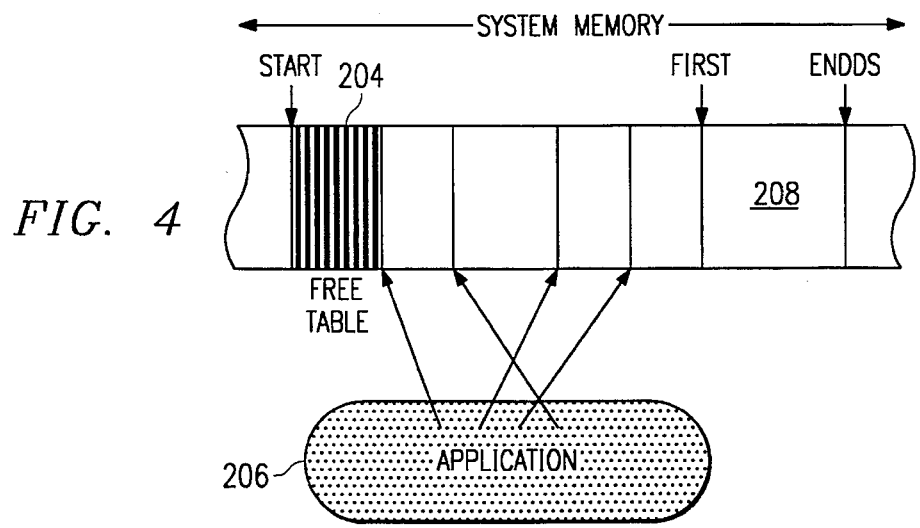
FIG. 4 illustrates a portion of system memory being accessed by a application program.

FIG. 4 illustrates the system memory. The memory manager 200 manages the area or blocks of system memory between the start pointer and the ENDDS pointer defining the available memory pool 208. The free table 204 is located at or near the beginning of system memory. If the application program 206 being executed in processor 220 requires space larger than the free area 208, the memory manager Sbrkd or enlarges the free block 208 by an appropriate size, for example by either the larger of one mega byte or the requested block size. Thus, the memory manager 200 obtains memory in large fixed single block chunks and then allocates smaller blocks to application 206 as requested.

Figure 7:
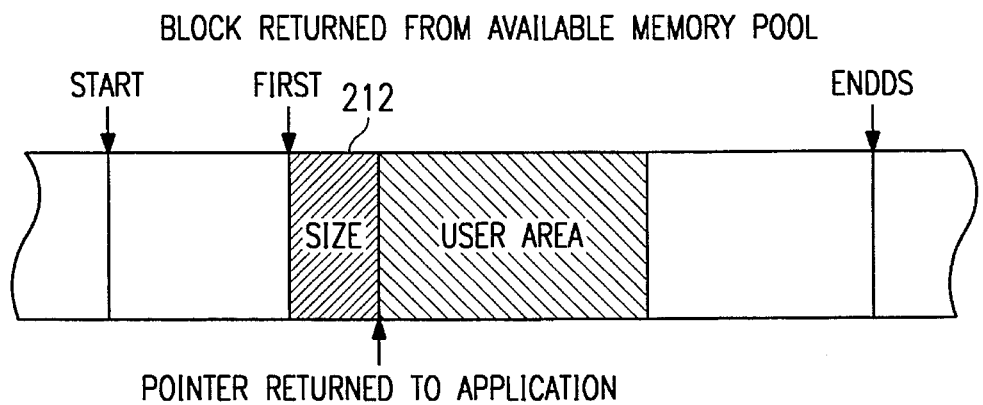
FIG. 7 illustrates a block returned from the available memory pool.

As illustrated in FIG. 7, when an allocation request for a free block is made by application 206, the memory manager 200 checks the free table 204 for a free block which is as large as the requested size from the application 206. If the free table 204 has a large free block of matching size, this free block is removed from the free list and returned to the application. If the memory manager 200 determines that the free table 204 does not have a sufficiently large free block, then a free block is returned from available memory pool 208 by the memory manger 200. By using the free table 204, the memory manger 200 eliminates the exhaustive search of the system memory for a free block of appropriate size.

An explanation of the free table and associated lists are described next.

Figure 6:
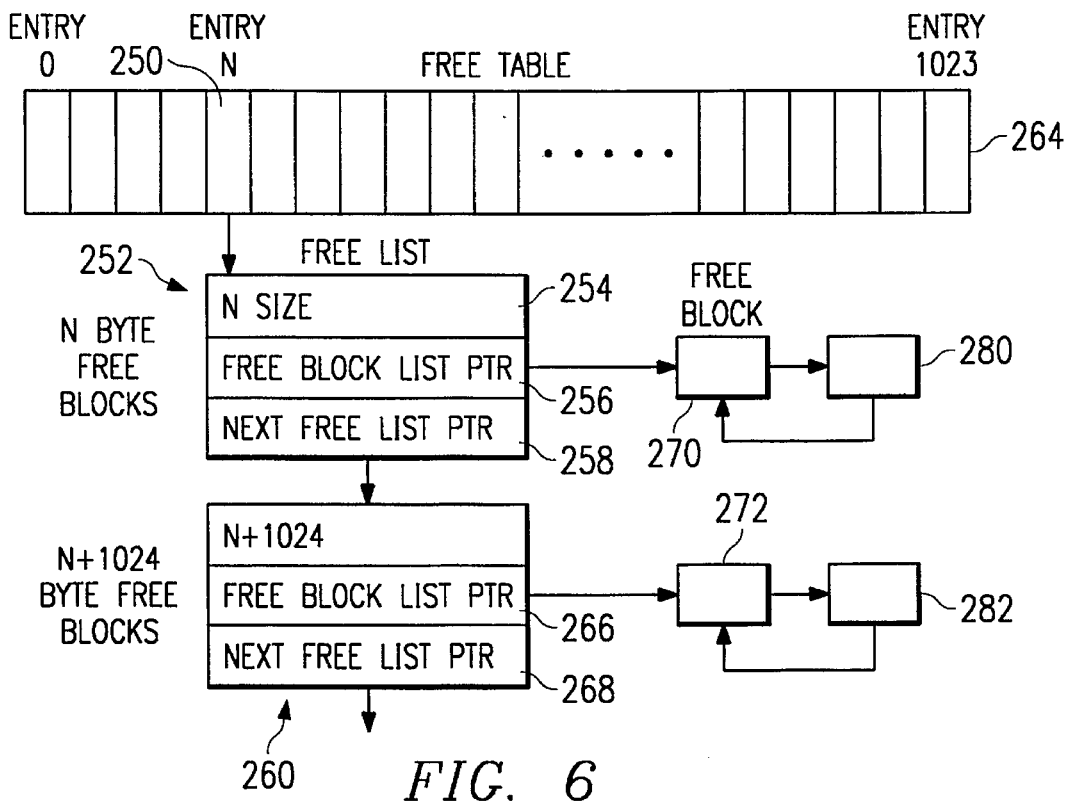
FIG. 6 illustrates a free table, a free list and free blocks.

FIG. 6 illustrates a free table having 1,024 entries. The entries begin with entry 0 and ends with entry 1023. Each entry may be 4 bytes in size and initially are all zeros. The entry N250 is a pointer to a free list 252. The free list 252 includes in the first four bytes a size corresponding to the size of each of the free blocks associated with the free list 252, a free block list pointer 256 which may be four bytes and which points to the first free block 270 which in turn points to another free block 280 which in turn points to free block 270 forming a circular chain of free blocks. Additionally, the free list 252 includes a four byte pointer, namely next free list pointer 258 to the next free list 260. The last free list of any entry points to a null set to indicate that this is the last free list for that entry. Likewise, the free list 260 includes free block list 266 to point to a free block 272 which in turn points to a free block 282 and which in turn points to free block 272.

Figure 5:
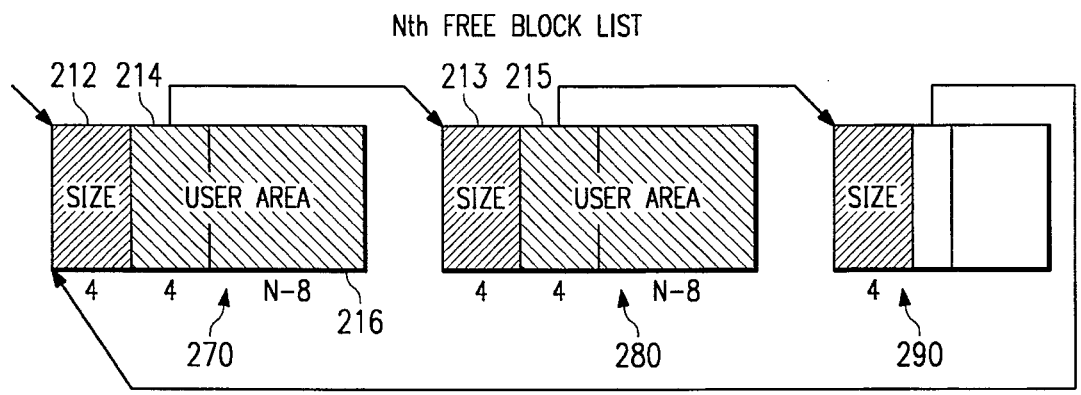
FIG. 5 illustrates a free block list of the present invention.

FIG. 5 illustrates free block 270, free block 280 and free block 290. The size area 212 of free block 270 includes 4 bytes having the size of free block 270. Adjacent to size area 212 is the next free block area 214 which may be 4 bytes and includes a pointer to the next free block, for example, free block 280. Likewise, the size area 213 of free block 280 includes a size of free block 280 which may be 4 bytes while the adjacent next free block area 215 includes the pointer to the next free block which may be free block 290. The last free block for example free block 290 by the next free block (not shown) area points to the first free block, namely free block 270 specifically size area 212. Thus, the free blocks form a circular list.

FIG. 3 illustrates that the required block sizes for the application 206 can be of any size; however, most of the occurrences occur for the smaller block sizes and as the block sizes become larger, the frequency of the block sizes decreases significantly. A method of distributing these block sizes over a predetermined sized free table is necessary in order to avoid a linked list. If the free table were large enough to have an entry free for each block size or every practical free block size, then the free table would be unmanageably large. In order to maintain a limited number of entries in the free table, some method must be implemented to distribute the different free block sizes among the entry of the free table. The requirements are that the selected method substantially evenly distributes the free block sizes among each of the entries so that the free list of each entry of the free table is approximately the same length, for example, approximately the same number free lists for each entry and secondly, that the entry can be obtained for a specific block size by a known algorithm such that the same entry is obtained for different requests for free blocks having the same size, namely, repeatability. One such algorithm that performs this function is the modulo function. Specifically, if the modulo is based on the number of entries in the free table, then an even distribution over the entries of the free table will be obtained. Secondly, since the modulo function is a repeatable algorithm, free blocks request of the same size will be directed to the same entry. Another possible algorithm may be hashing.

The actual operation of the memory manager 200 is now discussed. Assuming the entries of the free table 204 were all zero during initialization, if there was a request from the application 206 to the memory manager 200 to a free a block, the size of the block to be freed is obtained and divided by the size of the free table, for example 1024 and the remainder of this division is used as the displacement into the free table 204 so that the address of the entry can be determined, for example the address stored at position entry N250. The entry is read and since this is an initialization, the entry is a null. A free list 254 is formed after the last block of memory utilized or allocated by application 206 in system memory of 12 bytes by the memory manager 200, the first four bytes of free list 254 includes the size of the free block available. The memory manager 200 stores the size of the free block in these four bytes. As size 252 of the free list 252. The pointer or the address of the free block is placed in the free block list pointer 256 by the memory manager 200. The free block 270 includes the size area 212 of the free block. If another free block is made available of the same size, the entry N250 is obtained by the memory manager 200 by the modulo procedure described. This points to the free list 252 so that the memory manager 200 can address the free list 252; the size 254 of the free list is read and compared by the memory manager 200 with the size of the block being freed. The free block list pointer 252 is read so that the memory manager can access, through addressing, free block 270. The memory manager 200 places in the next free block area 214 of free block 270 a pointer or address to free block 280. Thus, the memory manager places a pointer to free block 270 in next free block area 215 of free block 280 so that it points to the free block 270, completing the circular file of free blocks.

As another size of free block is made available having the same modulo as entry N250, for example, a size the same as free block 270 plus 1024 bytes. The remainder of the size of this free block, for example free block 272, is used as a displacement to entry N250. From entry N250, the pointer to free list 252 is obtained by the memory manager. Since the size 254 of free list 252 is not the same as the size of free block 272. Another free list 260 is required after the memory manager 200 has compared the size from size area 252 with the size of free block 272. The memory manager reads the pointer to next free list at next free list pointer 256 of the free list 252. The next free list pointer 258 points by an address to the free list 260; the size of the free list 260 has been set to the size of free block 272 by the memory manager 200. The size area of free block 272 is set to the size of free block 272. The free block area of free block 272 is set to point to 272 (itself) to indicate that there is only one free block corresponding to this free list 260.

In order to obtain a free block for an application, for example with the size of free block 270 or the size of free block 280, a modulo on the size is performed by the memory manager 200. The remainder from the modulo operation 1024 is used as a displacement to entry N250 by the memory manager 200. The desired size of the free block for use by the application is compared by the memory manager 200 with the size 254 of the free list 252 and since a match is obtained, the free block list pointer 256 points to free block 270 and the next free block area 214 points to the free block 280. Free block 270 is released as available to the application by the memory manager 200. The free block list pointer 252 is changed to point, by addressing, to free block 280, and the next free block area of free block 280, changed to point to 280 the next free block 280 is available to be used by an application. Thus, with a minimum of reads and writes, a free block is obtained.

Figure 9:
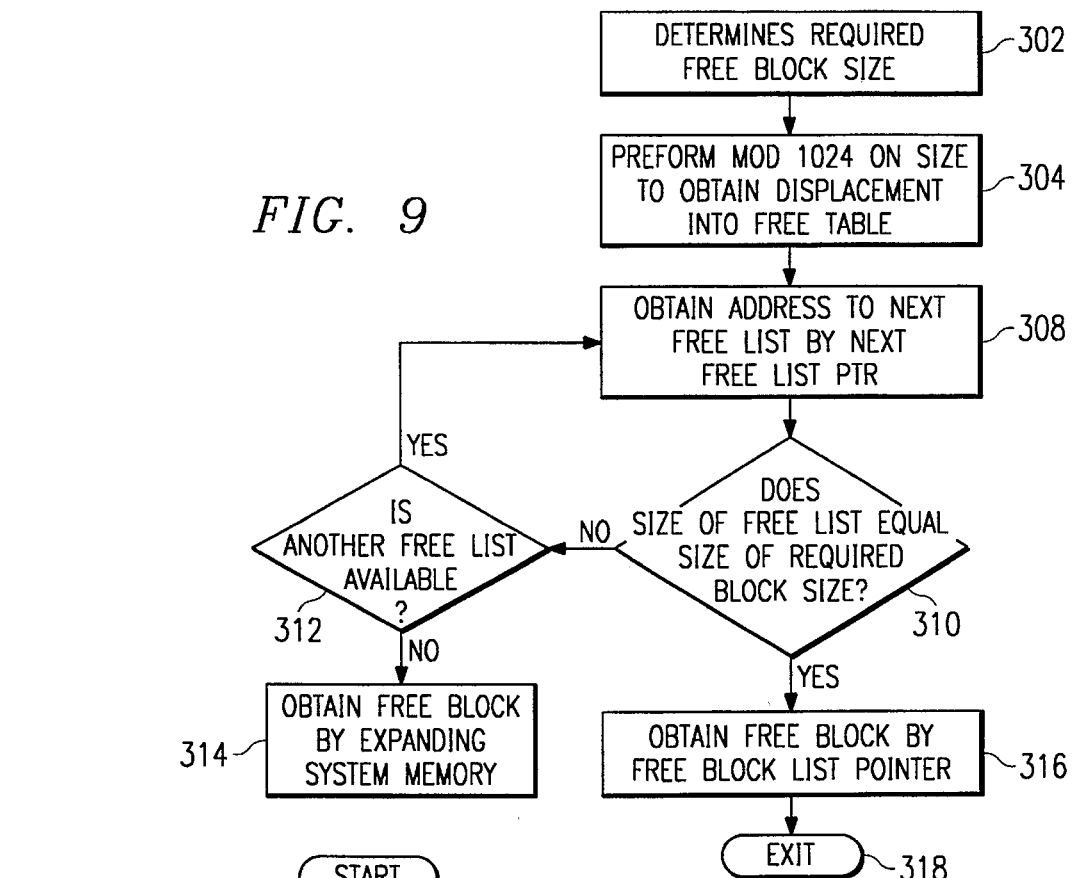
FIGS. 9 & 10 illustrates flow charts of the present invention.

FIG. 9 illustrates the operation of a request for a free block. In block 302, the memory manager 200 determines the required free block size. At block 304, the memory manager performs a modulo 1024 on the size to obtain the displacement into the free table. At block 308, the memory manager 200 obtains the address to the next free list by the next free list pointer of the current free list. At block 310, the memory manager determines if the size of the free list equals the size of the required block size. If no, at block 312, the memory manager 200 determines if another free list is available with respect to this entry of the free table. If the result from block 312 is no, at block 314 the memory manager obtains a free block by expanding system memory. For example, providing an allocation of memory between the pointer first and the pointer ENDDS. If the result of block 312 is yes, at block 308, the memory manager obtains the address to the next free list by the next free list pointer. If the result of the decision in block 310 is yes, the memory manager obtains, at block 316, a free block by the free block list pointer. At block 316, the memory manager exits.

Figure 10:
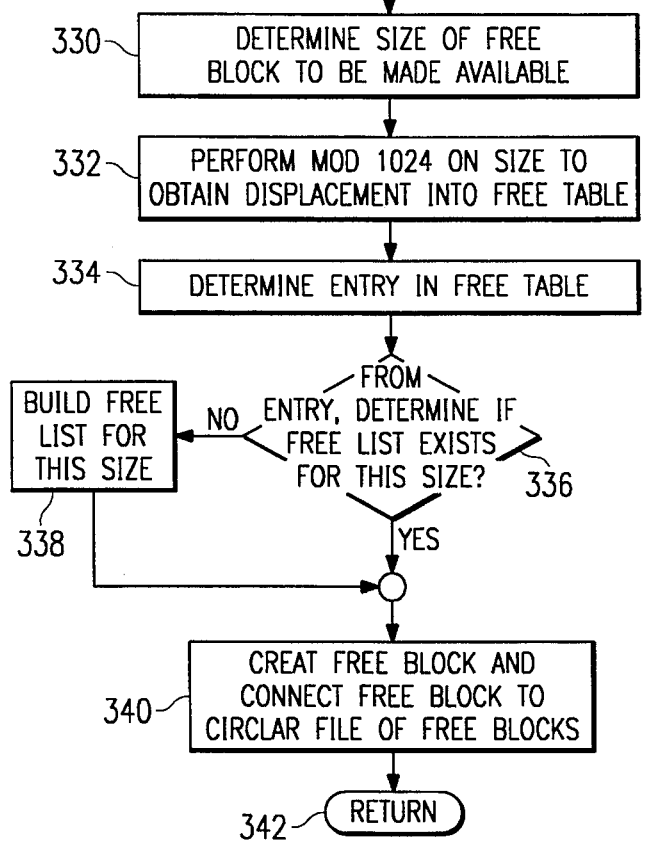

FIG. 10 illustrates the return of a free block to the memory manager 200. At block 330, the memory manager determines the size of the free block to be made available to be used at a future time. At block 332, the memory manager 200 performs a modulo 1024 on the size to obtain the displacement into the free table. At block 334, the memory manager 200 determines the entry in the free table. At block 336, the memory manager determines from the entry if the free list exists for this size. If the decision result is no from block 336, at block 338, the memory manager 200 builds a free list for this size of free block. The result from a yes at block 336 and operational flow from block 338 is combined at block 340 where the memory manager 200 creates a free block and connects the free block to a circular file of free blocks. At block 340, the memory manager returns.

Figure 11A:
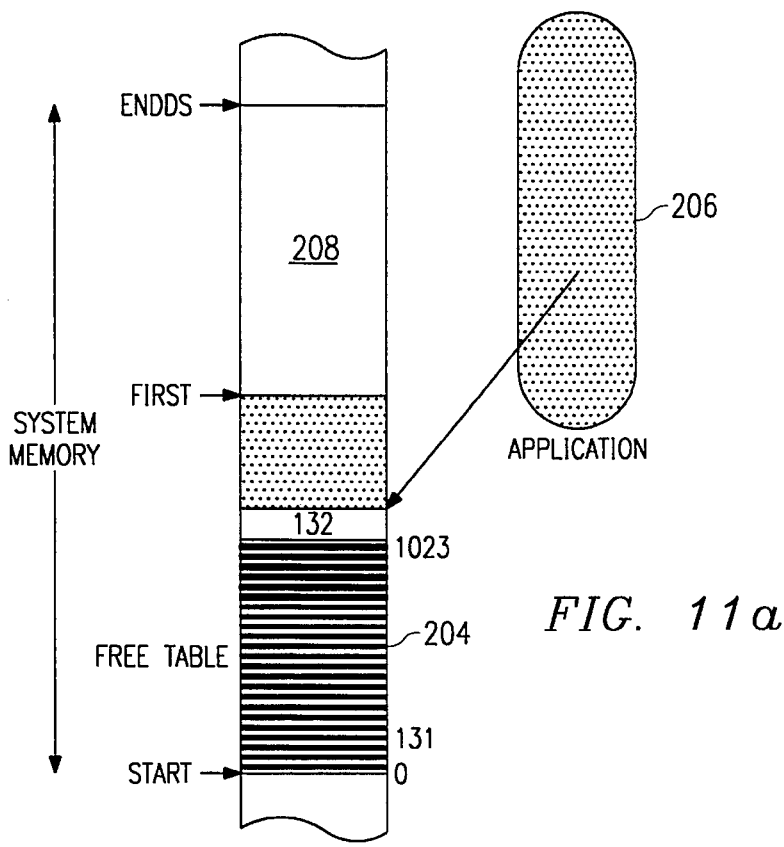
FIG. 11 a–e illustrates blocks in system memory.

FIGS. 11a–11e illustrate the allocation of five blocks of 128 bytes of memory. FIG. 11a illustrates the allocation first block of 132 bytes of memory directly behind the free table 204; four bytes of the 132 bytes is for the length of the block in bytes. The remaining 128 bytes is allocated to the application 206 directly behind the length. The first pointer pointing to the beginning of the available memory pool 208 while the ENDDS points to end of the available memory pool 208.

Figure 11B:
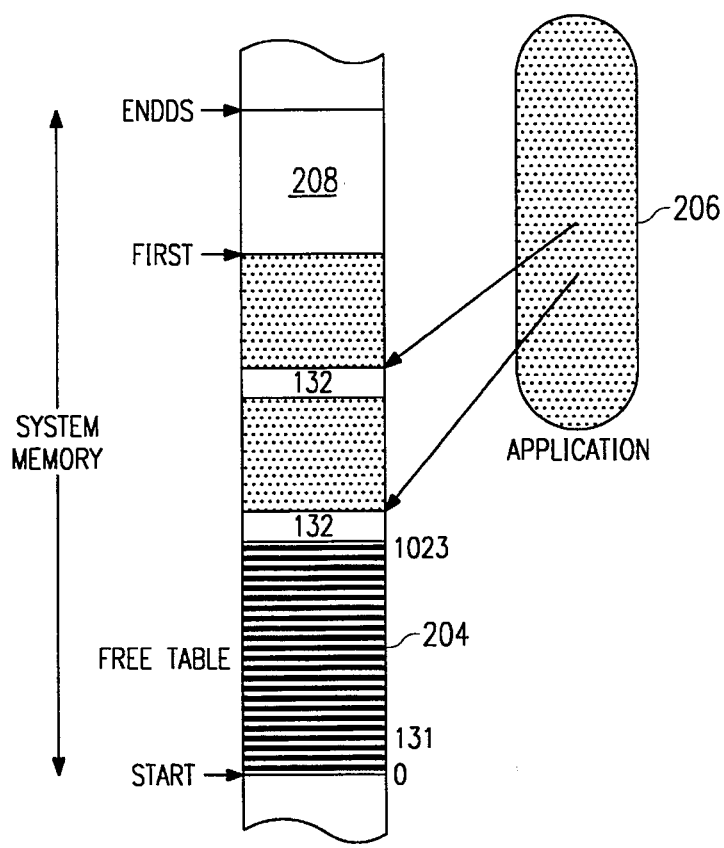

FIG. 11b illustrates an allocation of an additional and second 132 bytes for the application 206. Again, four bytes of the 132 bytes is for the length of the allocated block. Again, directly behind both the two allocated blocks is the available memory pool 208 since another 132 blocks has been allocated from the free block 208; the first pointer has been changed to point to the beginning of free block 208 now 132 bytes further into system memory. The pointer ENDDS remains unchanged.

Figure 11C:
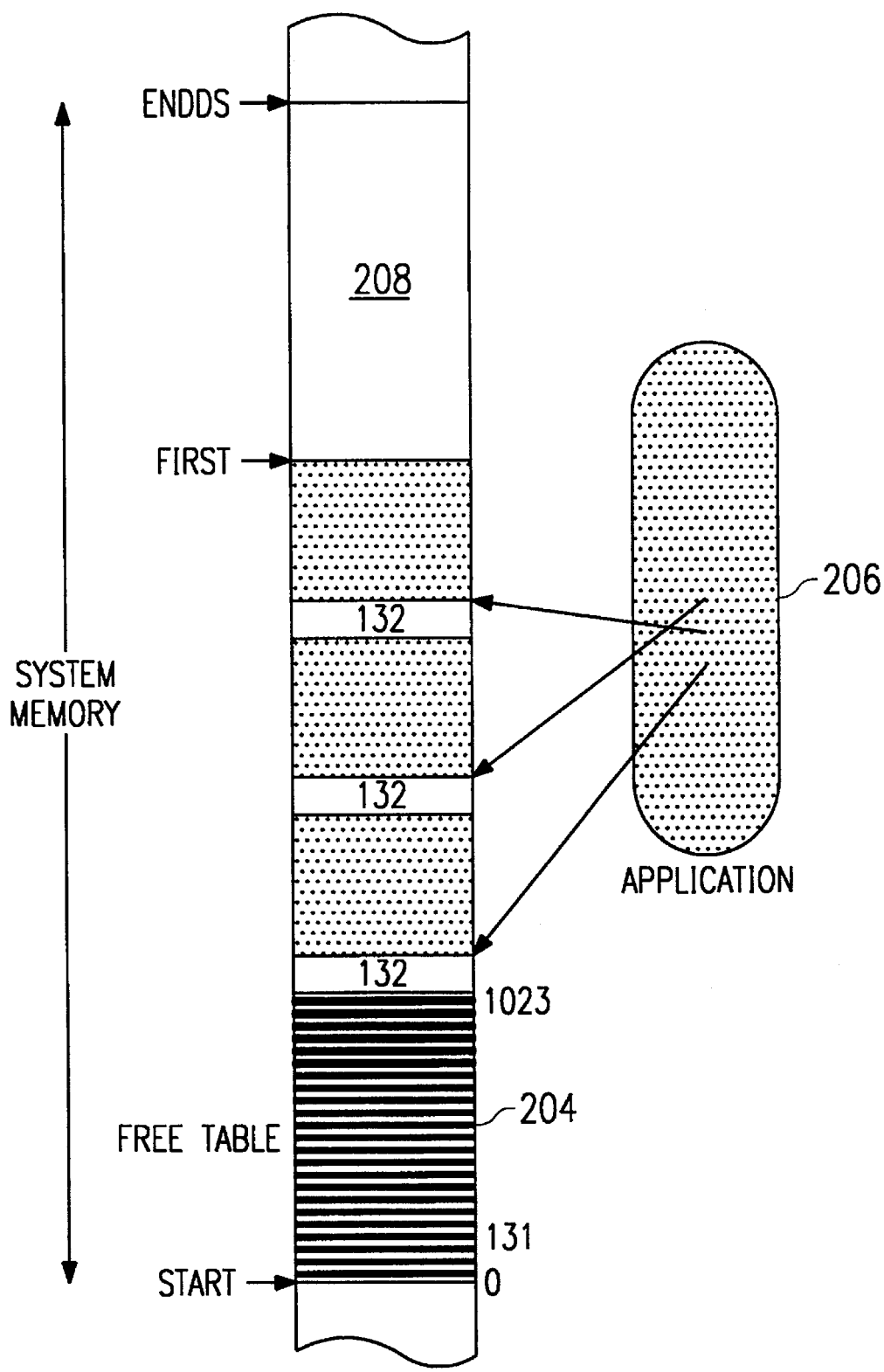

FIG. 11c illustrates the allocation of the third request for a 128 byte block of system memory for application 206.

Since there is no longer 132 bytes of free space between the first pointer and the ENDDS pointer, additional free space 208 must be allocated. Thus, the ENDDS pointer is moved further back into system memory, for example, one mega byte. Now, the third 128 byte block can be allocated for the application 206 by the memory manager 200.

Figure 11D:
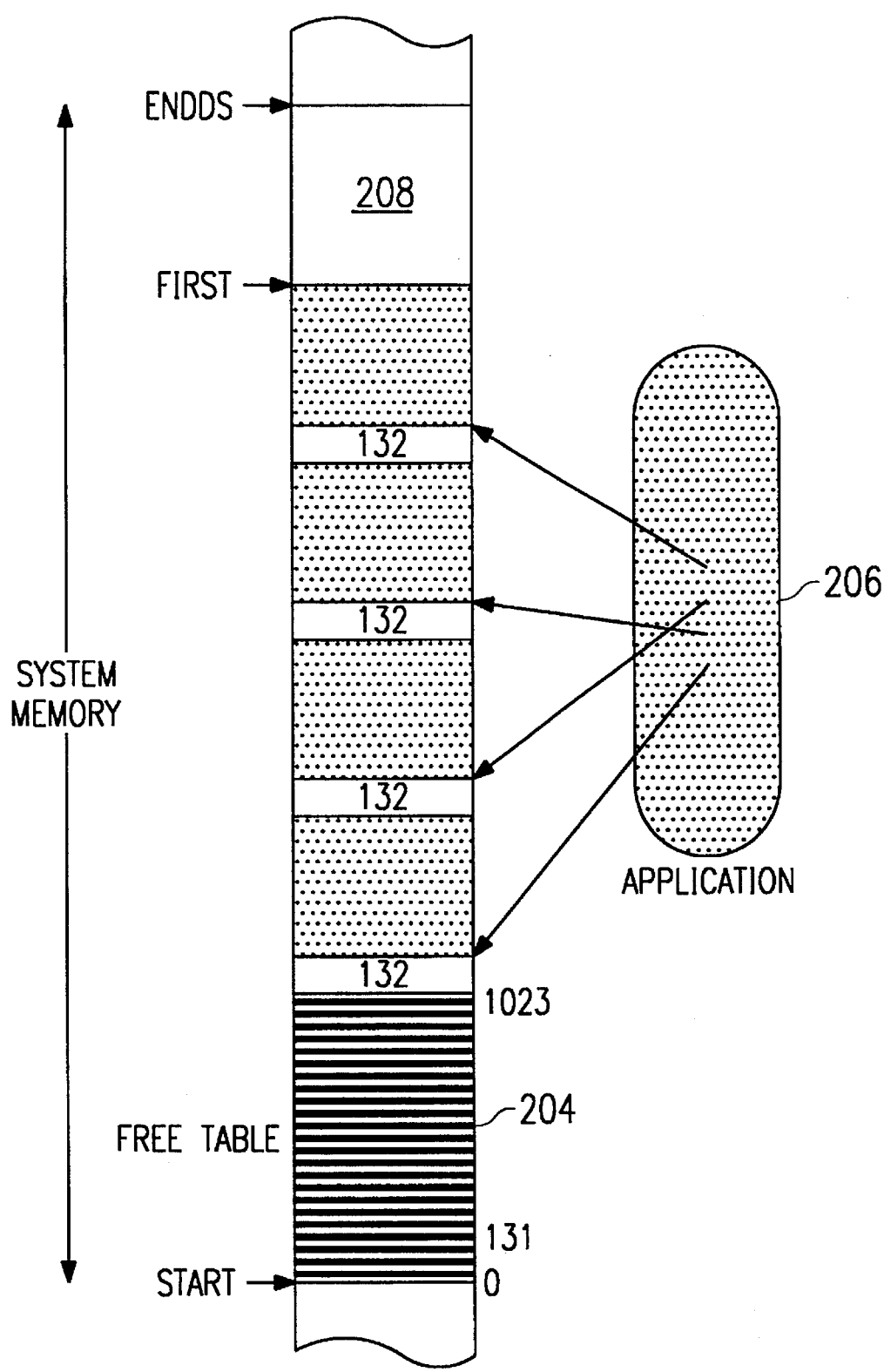

FIG. 11d illustrates the allocation of the fourth 128 byte block for application 206. Since the 132 bytes including the length for the 128 byte block allocation can be obtained within the free space 208, the first pointer is moved back.

Figure 11E:
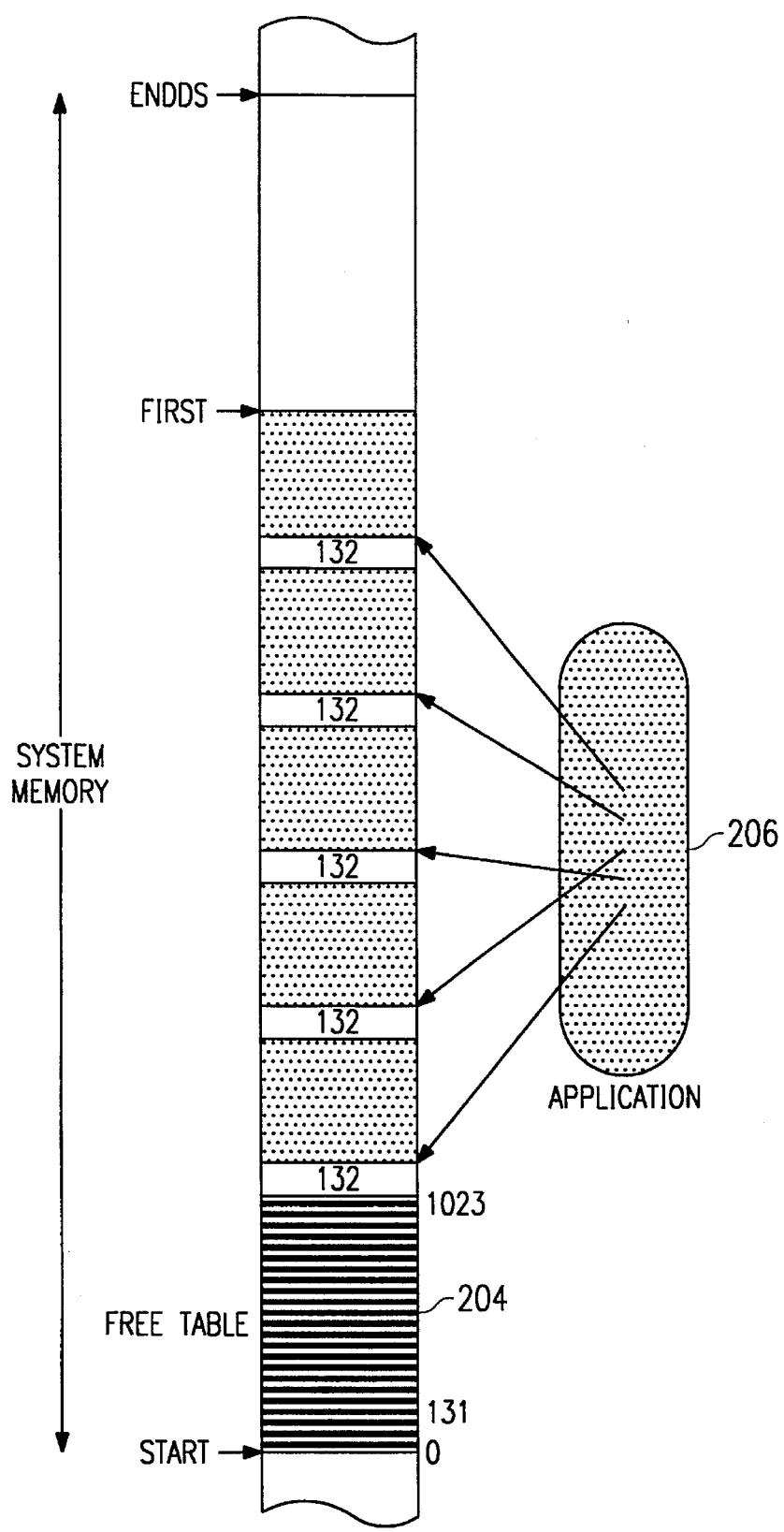

FIG. 11e illustrates the allocation of the fifth 128 byte block for the application 206. Since the 132 byte block for the 128 byte block of allocation exceeds the memory available in the free block 208, the ENDDS pointer is moved back in system memory, for example, one mega byte in order to provide additional free available memory pool 208. Now sufficient space exists for allocating the fifth 128 byte block and the first pointer is moved back 132 bytes to allocate the fifth block for application 206.

Figure 12A:
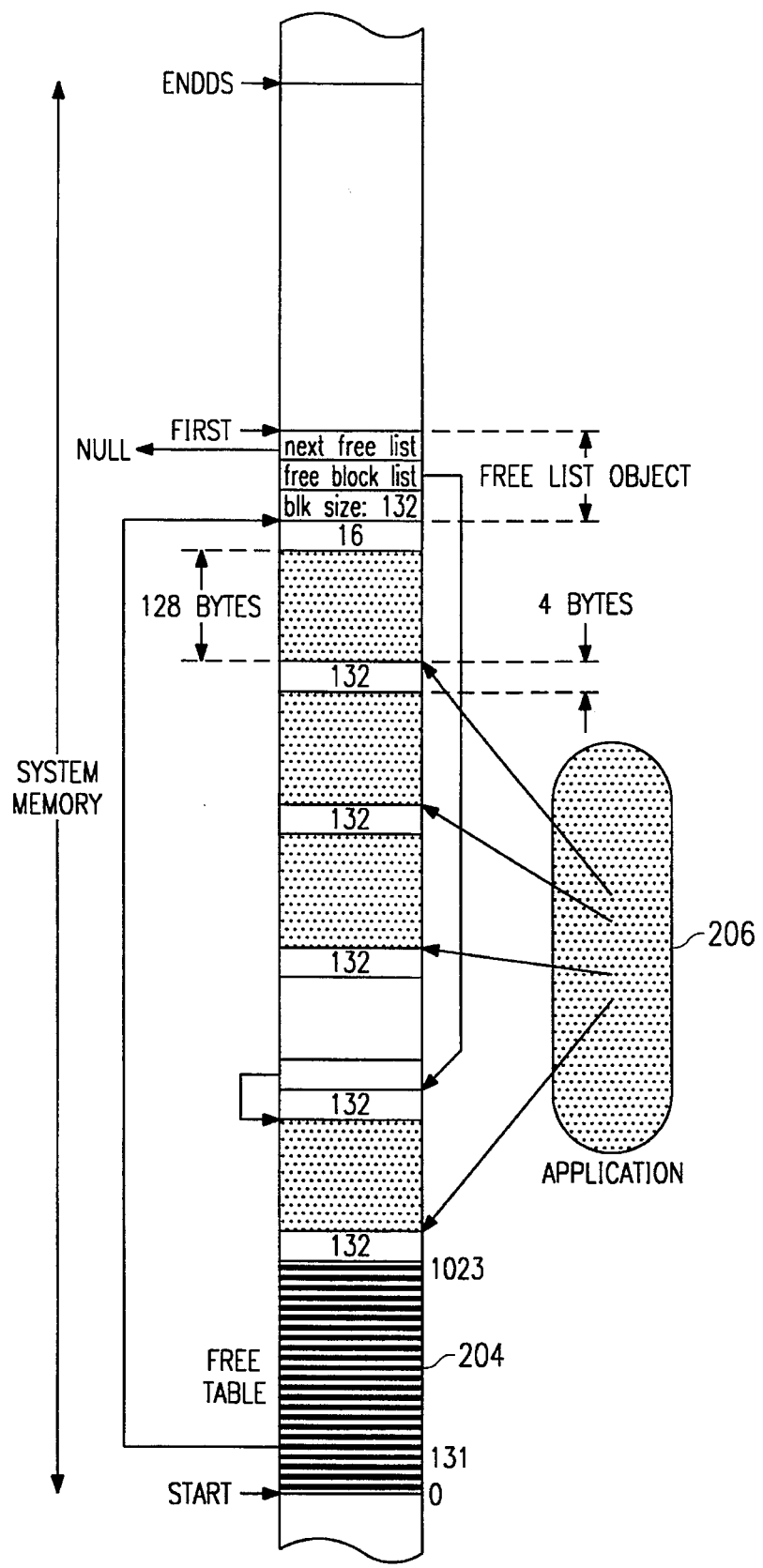
FIG. 12 a–c illustrates de-allocating blocks in system memory.
Figure 12B:
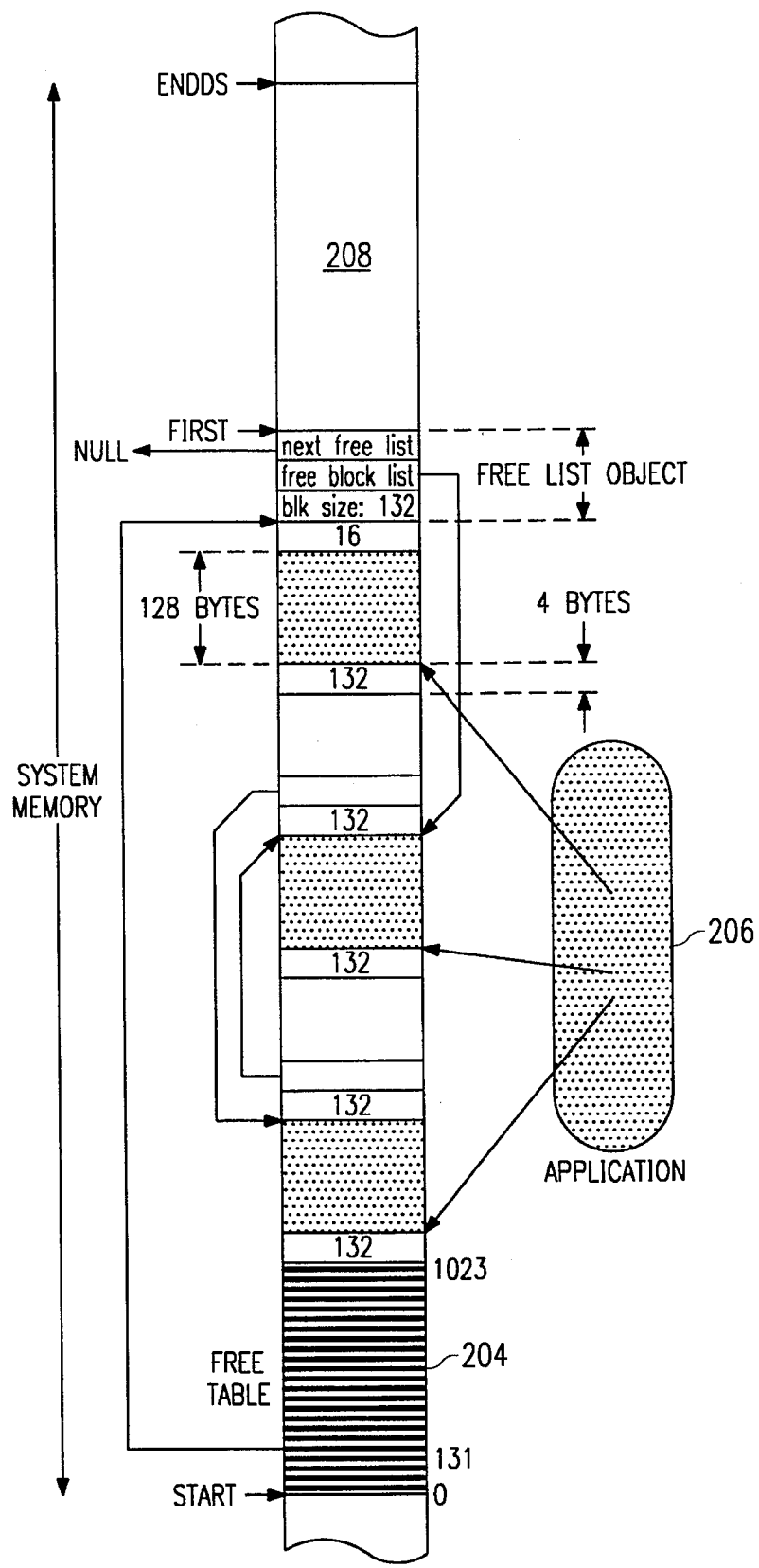
Figure 12C:
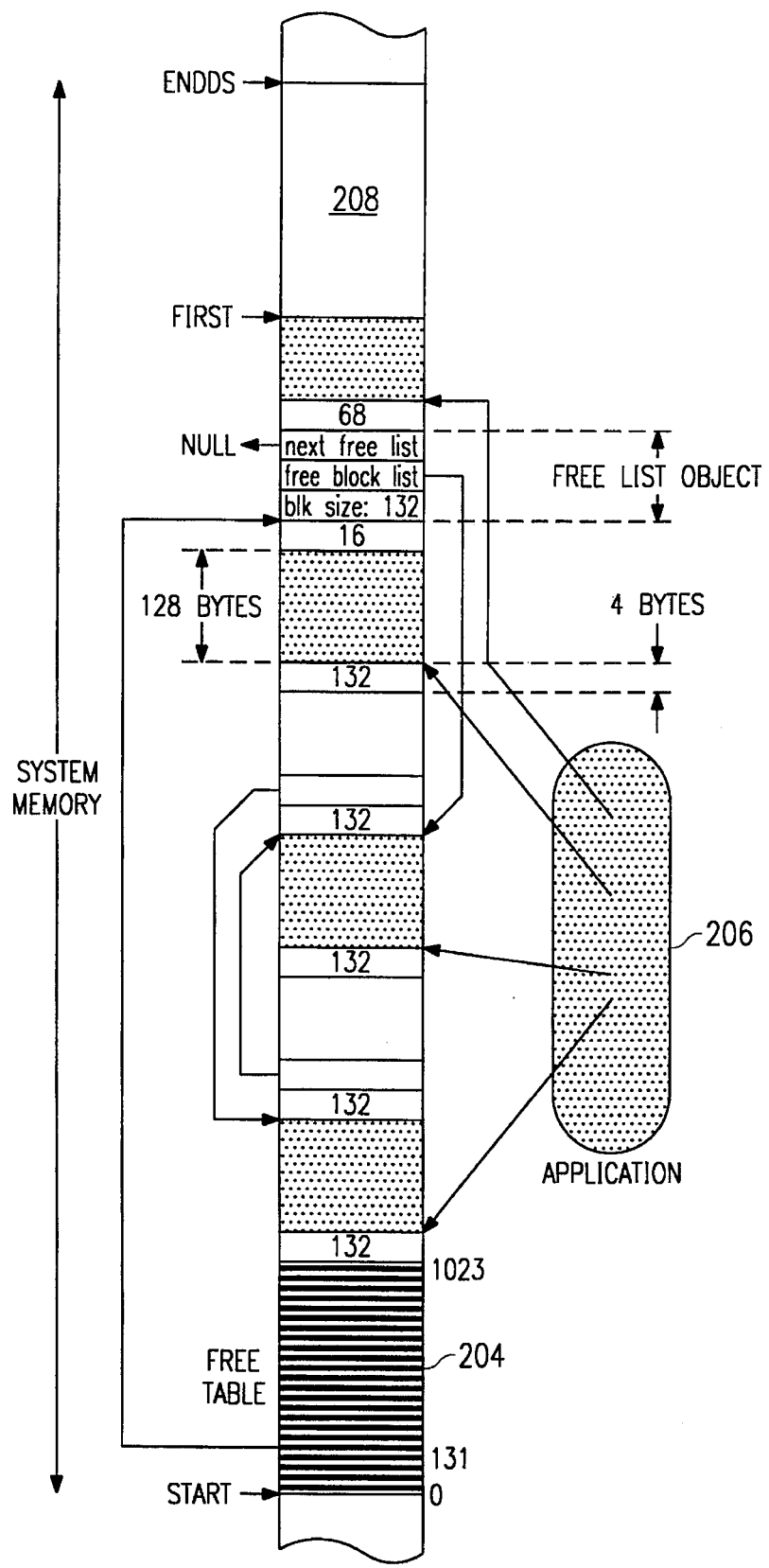

The deallocation of the allocated blocks is now illustrated in FIGS. 12a–12c. For example, the application may no longer require the second block that has been allocated, and the application 206 may wish to return the space to the memory manager 200. Since the free list has not been created before, a free list of 12 bytes for this size of free blocks is created behind the last allocated block of storage. The first pointer is moved 16 bytes, leaving 12 bytes directly behind the last allocated area and 4 bytes for the block size of 132, four bytes for the free block list pointer which points to the beginning of the free block list in system memory to be deallocated and four bytes for a next free list pointer to the next free list.

FIG. 12b illustrates the freeing of the fourth allocated block by the memory manager 200 after the application 206 has released it to be freed. Since the size is the same as the previous free block, no additional free list is required at this time. A second free block is generated within the first 8 bytes of the deallocated block. The next free block area of the first deallocated block points, by addressing, to the beginning of the second free block while the free block list pointer still points to the beginning of the first free block.

FIG. 12c illustrates allocation of 68 bytes for of a 64 byte block required by the application 206 by the memory manager 200. The size of the 64 byte block is allocated directly behind the free list. The free list is not deallocated, but remains in place, the required 64 byte blocks are allocated directly behind the size of the allocated block and the first pointer of the free block 208 is placed directly behind the allocated area.

FIG. 8 illustrates the sum sample results of the present invention. The design illustrates one application with differing inputs. The CPU time $T_1$ is the execution time of the application with a conventional memory manager. The CPU time $T_2$ is the execution time of the same application with memory manger 200. The delta T% is the percent improvement calculated by (T1–T2)T1* 100.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method for operating a memory computing system, said method comprising the steps of determining a free block size of a free block of a system memory to be used by an application program;

determining an entry in a table having a table size less than a system size of said system memory and having a plurality of entries, said entry being obtained by said free block size such that said entry may be accessed by at least two different free block sizes to provide an address for the free areas for each of said at least two different free block sizes and each of said entries of said table having substantially the same number of free blocks accessing said table;

accessing a free list through said entry in said table, said free list being associated with said free blocks being of said at least two different free block size;

requesting one of said free blocks of said at least two different free block size for an application to use in said memory system.

2. A method of operating a memory computing system as in claim 1, wherein said determining an entry in a table step include the step of determining an additional entry by using a modulo function of said free block size.

3. A method for operating a memory computing system as in claim 1, wherein said determining an entry in a table step include the step of determining an entry by using a modulo 1024 function of said free block size.

4. A method for operating a memory computing system as in claim 1, wherein said access step includes the step of accessing a free list by a pointer.

5. A method for operating a memory computing system as in claim 1, wherein said method further comprises the step of accessing said free block by a pointer.

6. A method for operating a memory computing system as in claim 1, where the method further comprises the step of positioning said free list after an allocated block of said system.

7. A method for operating a memory computing system as in claim 6, wherein the method further comprises the step of allocating blocks of memory after said free list.

8. A method for operating a memory computing system, said method comprising the steps of:

determining a free block size of a free block of a system memory to be used by an application program;

determining an entry in a table having a table size less than a system size of said system memory and having a plurality of entries, said entry being obtained by said free block size such that said entry may be accessed by at least two different free block sizes to provide an address for the free areas for each of said at least two different free block sizes and each of said entries of said table having substantially the same number of free blocks accessing said entry of said table;

determining if a free list has been created corresponding to said entry;

creating a free list if said free list had not been created corresponding to said entry;

connecting said free block to a circular file of at least one additional free block of the same size.

9. A method of operating a memory computing system as in claim 8, wherein said determining an entry in a table step include the step of determining an additional entry by using a modulo function of said free block size.

10. A method for operating a memory computing system as in claim 8, wherein said determining an entry in a table step include the step of determining an entry by using a modulo 1024 function of said free block size.

11. A method for operating a memory computing system as in claim 8, wherein said access step includes the step of accessing a free list by a pointer.

12. A method for operating a memory computing system as in claim 8, wherein said method further comprises the step of accessing said free block by a pointer.

13. A system for operating a memory computing system, said system comprising:

means for determining a free block size of a free block of a system memory to be used by an application program;

means for determining an entry in a table having a table size less than a system size of said system memory, said entry being obtained by said free block size such that said entry may be accessed by at least two different free block sizes to provide an address for the free areas for each of said at least two different free block sizes and each entry of said table having substantially the same number of free blocks accessing said table;

means for accessing a free list through said entry in said table, said free list being associated with said free blocks being of said at least two different free block size;

means for requesting one of said free blocks of said at least two different free block size for an application to use in said memory system.

14. A system for operating a memory computing system, said method comprising:

means for determining a free block size of a free block of a system memory to be used by an application program;

means for determining an entry in a table having a table size less than a system size of said system memory and having a plurality of entries, said entry being obtained by said free block size such that said entry may be accessed by at least two different free block sizes to provide an address for the free areas for each of said at least two different free block sizes and each of said entries of said table having substantially the same number of free blocks accessing said entry of said table;

means for determining if a free list has been created corresponding to said entry;

means for creating a free list if said free list had not been created corresponding to said entry;

means for connecting said free block to a circular file of at least one additional free block of the same size.

* * * * *